(12) United States Patent
Imai et al.

(10) Patent No.: US 8,670,609 B2
(45) Date of Patent: Mar. 11, 2014

(54) SYSTEMS AND METHODS FOR EVALUATING IMAGES

(75) Inventors: Francisco Imai, Mountain View, CA (US); Andy Lai Lin, Parsippany, NJ (US)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 13/189,409

(22) Filed: Jul. 22, 2011

(65) Prior Publication Data

US 2013/0022261 A1 Jan. 24, 2013

(51) Int. Cl.
*G06K 9/34* (2006.01)

(52) U.S. Cl.
USPC .............................. 382/154; 382/173; 382/190

(58) Field of Classification Search
None
See application file for complete search history.

(56) References Cited

U.S. PATENT DOCUMENTS

| | | | |
|---|---|---|---|
| 3,919,447 A * | 11/1975 | Kilmer et al. | 428/138 |
| 4,858,000 A * | 8/1989 | Lu | 725/12 |
| 5,852,823 A * | 12/1998 | De Bonet | 382/279 |
| 6,711,293 B1 | 3/2004 | Lowe | |
| 6,763,148 B1 | 7/2004 | Sternberg | |
| 7,099,860 B1 * | 8/2006 | Liu et al. | 1/1 |
| 7,646,887 B2 | 1/2010 | Goncalves | |
| 7,680,341 B2 | 3/2010 | Perronnin | |
| 7,761,466 B1 | 7/2010 | Eshghi | |
| 2006/0012677 A1 | 1/2006 | Neven | |
| 2007/0081744 A1 | 4/2007 | Gokturk | |
| 2007/0175998 A1 | 8/2007 | Lev | |
| 2010/0265386 A1 | 10/2010 | Raskar | |
| 2010/0310174 A1 | 12/2010 | Reznik | |
| 2012/0106781 A1 * | 5/2012 | Kozitsky et al. | 382/103 |
| 2012/0188344 A1 * | 7/2012 | Imai | 348/47 |

OTHER PUBLICATIONS

Plaza, Antonio, et al. "Spatial/spectral endmember extraction by multidimensional morphological operations." Geoscience and Remote Sensing, IEEE Transactions on 40.9 (2002): 2025-2041.*
Tilton, James C. "Image segmentation by region growing and spectral clustering with a natural convergence criterion." Geoscience and Remote Sensing Symposium Proceedings, 1998. IGARSS'98. 1998 IEEE International. vol. 4. IEEE, 1998.*
Picitup Picliq Mobile Visual Search, 2010.
Picitup Picolor Photo Based Color Search, 2010.
Canesta 101 Introduction to 3D Vision in CMOS, Mar. 2008.
PMD Technologies, PMD [vision] CamCube 2.0, 2010.
Marcal, A Framework for the Evaluation of Multi-Spectral Image Segmentation, The International Archives of the Photogrammetry, Remote Sensing and Spatial Information Sciences, vol. 34, Part XXX, 2008.
NASA Media Briefing: New Technology Could Aid in Interpretation of Medical Imagery, Oct. 14, 2010, downloaded from http://www.nasa.gov/topics/nasalife/features/medical-imagery-briefing-20101014.html.

* cited by examiner

*Primary Examiner* — Stephen R Koziol
*Assistant Examiner* — Amandeep Saini
(74) *Attorney, Agent, or Firm* — Canon U.S.A., Inc. IP Division

(57) ABSTRACT

Systems and methods for evaluating images segment a computational image into sub-images based on spectral information in the computational image, generate respective morphological signatures for the sub-images, generate respective spectral signatures for the sub-images, and generate a resulting image signature based on the morphological signatures and the spectral signatures.

19 Claims, 8 Drawing Sheets

SYSTEMS AND METHODS FOR EVALUATING IMAGES

BACKGROUND

1. Field of the Disclosure

The present disclosure relates generally to evaluating images.

2. Description of the Related Art

For mobile image matching, a visual database is typically stored at a server in the network. Hence, for a visual comparison, information must be either uploaded from a mobile camera device to the server, or downloaded from the server to the mobile camera device. Since wireless links can be slow, the response time of the system often depends on how much information must be transferred in both directions. Moreover, visual search algorithms often neglect color information. One reason for this lack of use of color information in visual searching may be the lack of correspondence between RGB colors in devices and the ground truth of the objects.

SUMMARY

In one embodiment, a method for evaluating an image comprises segmenting a computational image into sub-images based on spectral information in the computational image, generating respective morphological signatures for the sub-images, generating respective spectral signatures for the sub-images, and generating a resulting image signature based on the morphological signatures and the spectral signatures.

In one embodiment, a system for evaluating an image comprises a computer readable medium, a network interface configured to send data to and receive data from one or more other devices or systems, and one or more processors configured to cause one or more computing devices to generate sub-images from a computational image based on spectral information in the computational image, generate respective morphological signatures for the sub-images, generate respective spectral signatures for the sub-images, and generate a combined image signature based on the morphological signatures and the spectral signatures.

In one embodiment, one or more computer-readable media store instructions that, when executed by one or more computing devices, cause the one or more computing devices to perform operations comprising partitioning a computational image into sub-images based at least on spectral information in the computational image, generating respective spectral signatures for the sub-images, and generating respective morphological signatures for the sub-images.

DETAILED DESCRIPTION

The following description is of certain illustrative embodiments, and the disclosure is not limited to these embodiments, but includes alternatives, equivalents, and modifications such as are included within the scope of the claims. Additionally, the illustrative embodiments may include several novel features, and a particular feature may not be essential to practice the systems and methods described herein.

Figure 1:
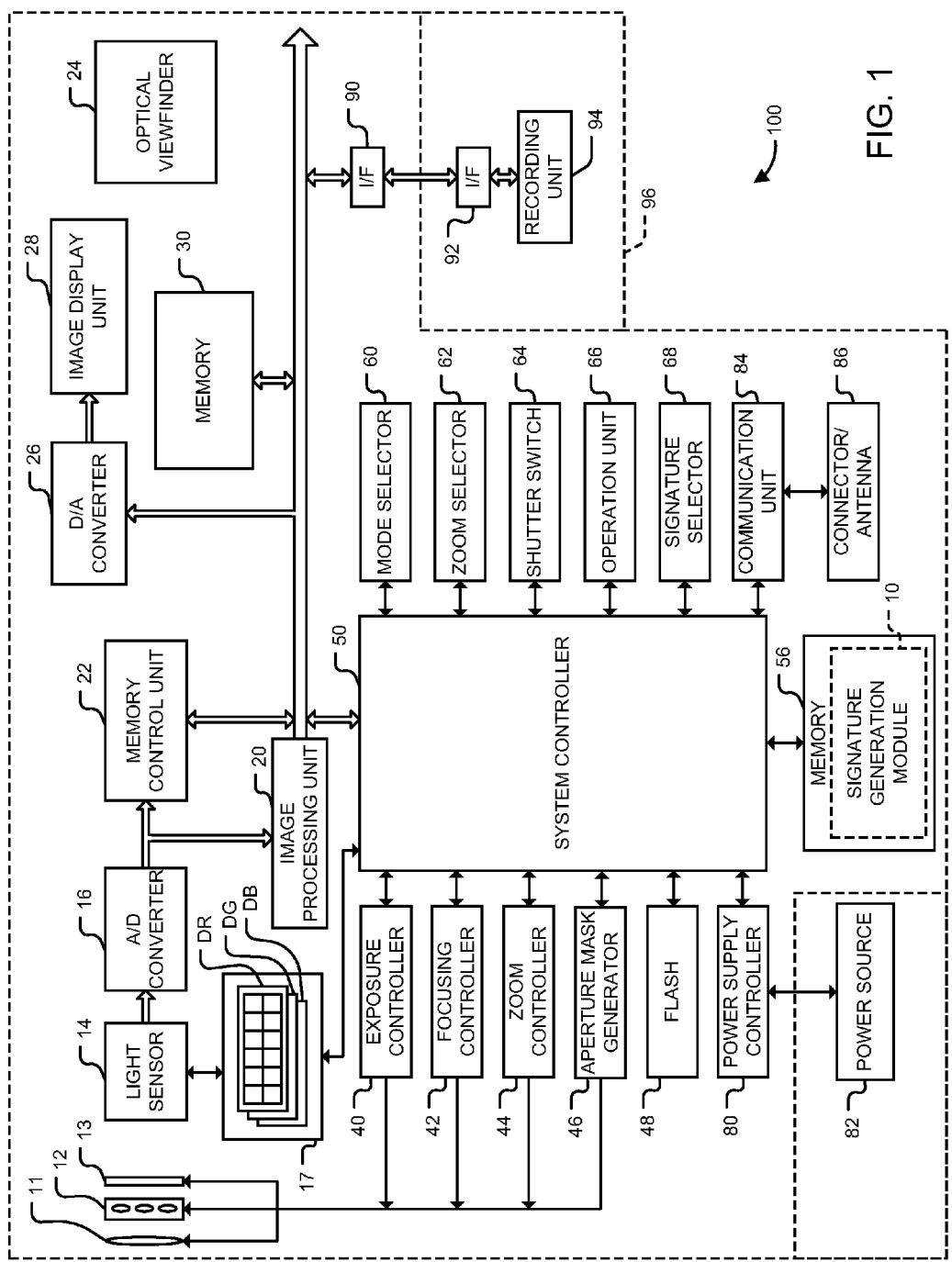
FIG. 1 illustrates an embodiment of a system for evaluating images.

FIG. 1 illustrates an embodiment of a system 100 for evaluating images. The system 100 captures an image, such as a computational image that includes more information than two-dimensional RGB information, and generates a signature from the captured image. Generating the signature may include segmenting the captured image into sub-images, and the captured image may be segmented based on the spectral information and/or the depth information in the captured image. For example, the spectral information may be used to identify different materials in the captured image, and the image may be segmented based on the materials. Generating the signature may include generating spectral signatures and/or morphological signatures for one or more of the sub-images. The spectral signatures and/or morphological signatures may then be used to conduct a search for other images that are similar and/or identical to the captured image. For example, the signature may be transmitted to an image repository device over a network, and the image repository device may use the signature to conduct the search. Transmitting the signature and using the image signature to conduct the search may speed up the transfer time, speed up the search time, or use fewer resources than transmitting the entire image and using the entire image to conduct the search. The image repository device may then send the results of the search to the system 100 and/or another computing device.

The system 100 includes a lens 11 (which may include a plurality of lenses and/or a microlens array), an aperture 12 (which may include a plurality of apertures, for example a multi-aperture array), a shutter 13, and a light sensor 14 (which may include a plurality of light sensors) that converts incident electromagnetic radiation (also referred to herein as "light") into electrical signals. Furthermore, in other embodiments the lens 11, the aperture 12, and the shutter 13 may be arranged differently than is shown in the embodiment of FIG. 1, and the system 100 may include plenoptic and/or polydipotric components and capabilities.

Light reflected from a scene (e.g., an object in the scene) passes through the lens 11, the aperture 12, and the shutter 13 (when open) to the light sensor 14 and may form an optical image on a light sensing surface of the light sensor 14. The light sensor 14 converts incident light to analog or digital image signals and outputs the signals to an ND converter 16 (in embodiments where ND conversion is necessary). The ND converter 16 converts analog image signals to digital image signals. The light sensor 14 may detect (which may include sampling or measuring) light in the spectrum visible to the human eye and/or in the spectrum invisible to the human eye (e.g., infrared, x-ray, ultraviolet). In some embodiments, the light sensor 14 can detect light fields, for example four-dimensional light fields.

The light sensor 14 may be tunable to sample light at specified wavelengths, and the range of sampled wavelengths and/or the increments between the sampled wavelengths may be adjusted (e.g., made finer or coarser) to capture more or less information about the different wavelengths of light reflected by an object. Thus, rather than detect only a sum total intensity of all light received, the light sensor 14 may be able to capture the intensity of the discrete component wavelengths of the light. For example, the light sensor 14 may sample light at 400-460 nm, 470-530 nm, 530-590 nm, 600-660 nm, and at 670-730 nm, and the detected light may be separately recorded by the system 100 for each range of sampled wavelengths. Or, for example, light may be sampled in a range of 40 nm with an increment of 10 nm between samples from 400 nm to 600 nm (e.g., 400-440 nm, 450-490 nm, 500-540 nm, and so forth).

In the embodiment shown, the spectral responsiveness of the light sensor 14 is specified by the capture parameter 17. In some embodiments, the capture parameter 17 comprises multiple spatial masks, such as one mask for each channel of information output by the light sensor 14, for example. Thus, where the light sensor 14 outputs a red-like channel, a green-like channel, and a blue-like channel, the capture parameter 17 includes a spatial mask DR for the red-like channel of information, a spatial mask DG for the green-like channel of information, and a spatial mask DB for the blue-like channel of information, though the capture parameter 17 may include more or less spatial masks and/or output more or less channels of information. Each spatial mask comprises an array of control parameters corresponding to pixels or regions of pixels in the light sensor 14. The spectral responsiveness of each pixel and/or each region of pixels is thus tunable individually and independently of other pixels or regions of pixels.

The light sensor 14 may include a transverse field detector (TFD) sensor. A TFD sensor has a tunable spectral responsiveness that can be adjusted by application of bias voltages to control electrodes, and spatial masks DR, DG, and DB may correspond to voltage biases applied to control electrodes of the TFD sensor. In some TFD sensors, the spectral responsiveness is tunable globally, meaning that all pixels in the light sensor are tuned globally to the same spectral responsiveness. In other TFD sensors, the spectral responsiveness is tunable on a pixel-by-pixel basis or a region-by-region basis. Bias voltages may be applied in a grid-like spatial mask, such that the spectral responsiveness of each pixel is tunable individually of other pixels in the light sensor, or such that the spectral responsiveness of each region including multiple pixels is tunable individually of other regions in the sensor. Also, in some embodiments the system 100 includes one or more tunable filters (e.g., tunable color filter arrays) and a monochromatic sensor. The tunable filters may be adjusted similar to the adjustment of a tunable light sensor, including the use of spatial masks, global tuning, regional tuning, and pixel-by-pixel tuning, as well as temporal tuning.

Additionally, the light sensor 14 may include one or more super-pixels that each includes a group of pixels. The group of pixels may include various numbers of pixels (e.g., 2, 4, 8, 16), however, resolution may decrease as the number of pixels in the group increases. The light sensor 14 may use an electronic mask to select pixels from the respective groups of pixels of the super-pixels.

The system 100 also includes an image processing unit 20, which applies resize processing, such as interpolation and reduction, and color conversion processing to data from the A/D converter 16, data from the light sensor 14, and/or data from a memory 30. The image processing unit 20 performs predetermined arithmetic operations using the image data, and the system 100 may perform exposure control and ranging control based on the obtained arithmetic result. The system 100 can perform TTL (through-the-lens) AF (auto focus) processing, AE (auto exposure) processing, and EF (flash pre-emission) processing. The image processing unit 20 further performs TTL AWB (auto white balance) operations based on the obtained arithmetic result.

Output data from the A/D converter 16 is written in the memory 30, for example via the image processing unit 20 and/or memory control unit 22. The memory 30 is configured to store image data that is captured by the light sensor 14 and/or converted into digital data by the ND converter 16. The memory 30 may store images (e.g., still photos, videos) and other data, for example metadata and file headers, for captured images. The memory 30 may also serve as an image display memory. A D/A converter 26 converts digital data into an analog signal and supplies that analog signal to an image display unit 28. The image display unit 28 renders images according to the analog signal from the D/A converter 26 on a display (e.g., an LCD, an LED display, an OLED display, a plasma display, a CRT display), though some embodiments may provide the digital data to the display unit 28 without converting the digital data to analog data. The system 100 also includes an optical viewfinder 24 (which may be an SLR viewfinder) that presents at least part of the view detected by the light sensor 14.

An exposure controller 40 controls the shutter 13 (e.g., how long the shutter 13 is open). The exposure controller 40 may also have a flash exposure compensation function that links with a flash 48 (e.g., a flash emission device). A focusing controller 42 controls the size of the aperture 12, and a zoom controller 44 controls the angle of view of the lens 11. The exposure controller 40, focusing controller 42, and zoom controller 44 may each partially control the lens 11, the aperture 12, and the shutter 13, and may collaborate to calculate settings for the lens 11, the aperture 12, and the shutter 13.

The aperture mask generator 46 generates masks that define aperture settings for respective apertures in an array of apertures. If the light sensor 14 includes super-pixels, each pixel in the group of pixels in a super-pixel may be able to be independently associated with an aperture in a multi-aperture array (e.g., one pixel to one aperture, many to pixels to one aperture). Thus, since light that passes through different apertures may be detected by at least one pixel in a group, a super-pixel may detect rays of light that each passes through a different aperture. For example, a super-pixel with four pixels may detect rays of light that have each passed through a different one of four apertures.

A multi-aperture array allows depth information to be captured that cannot be captured directly in a two-dimensional RGB image. For example, each aperture may be configured with a different depth of field and/or focal plane. Also, a microlens array may be used to capture more depth information in an image. The additional depth information may allow post capture refocusing of the image and construction of three-dimensional models of a scene.

A memory 56 (as well as the memory 30) includes one or more computer readable and/or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc. The memory 56 may store computer-executable instructions and data. The system controller 50 includes one or more central processing units (e.g., microprocessors) and is configured to read and perform computer-executable instructions, such as instructions stored in the memory 56. Note that the computer-executable instructions may include those for the performance of various methods described herein. The memory 56 is an example of a non-transitory computer-readable medium that stores computer-executable instructions thereon.

The memory 56 includes a signature generation module 10. A module includes computer-readable instructions that may be executed by one or more members of the system 100 (e.g., the system controller) to cause the system 100 to perform certain operations, though for purposes of description a module may be described as performing the operations. Modules may be implemented in software (e.g., JAVA, C, C++, C#, Basic, Assembly), firmware, and/or hardware. In other embodiments, the system 100 may include more modules and/or the signature generation module 10 may be divided into more modules. The instructions in the signature generation module 10 may be executed to cause the system 100 to generate one or more image signatures and/or perform the methods described herein. Modules may be implemented in any applicable computer-readable storage medium that can supply the computer-executable instructions. Furthermore, when the computer-executable instructions are executed, an operating system executing on the system 100 may perform at least part of the operations that implement the instructions.

The signature generation module 10 segments a computational image into sub-images based on spectral information in the computational image, and generates respective morphological signatures and/or spectral signatures for the sub-images. Additionally, the signature generation module 10 generates an image signature based on the morphological signatures and/or the spectral signatures. Segmenting the computational image into sub-images may include identifying one or more spectral properties in the computational image that correspond to one or more spectral properties (e.g., reflectance, reflectivity) of a material based on the spectral information in the computational image. Thus, the computational image may be segmented based on the materials that are in the image. Though the following examples are illustrative and not limiting, materials may include plastics, woods, metals, fabrics, plants, animals, ceramics, cements, glasses, papers, and rocks. The signature generation module 10 may also segment the computational image based on depth. Additionally, the signature generation module 10 may generate a respective three-dimensional histogram of gradients for the sub-images based at least in part on depth information in the computational image.

The morphological signatures may be generated using scale-invariant feature transform (SIFT), compressed histogram of oriented gradients (CHOG), edge orientation histograms, shape contexts, edge detection, speeded up robust features (SURF), grammars, and/or shading. Additionally, the morphological signatures may each include a three-dimensional histogram of gradients and may be generated using other techniques and/or algorithms.

The spectral signatures may be generated by correlating digital signals from the imaging system with a statistical model that describes one or more spectral properties of the material. For example, the digital imaging signals D (with dimensions $N \times M \times C$, where N is the number of rows in the image, M is the number of columns in the image, and C is the number of channels) can be used to estimate the coefficients of eigenvectors A (with dimensions $N \times M \times P$, where P is the number of eigenvectors) by a linear transformation T (with dimensions $C \times L$): $A = D \times T$. It is assumed that the camera signals are photometrically linear and this transformation is derived using a training set. A pre-calculated set of eigenvectors E (with dimensions $P \times L$, where L is the number of wavelengths) are calculated for relevant and representative spectral reflectances most commonly found in typical scenes. The coefficients of eigenvectors A could be used as spectral signatures. It is possible to derive a spectral reflectance image R (with dimensions $N \times M \times L$) by combining coefficients of eigenvectors A with eigenvectors E in the following manner: $R = AE$.

The system 100 also includes a mode selector 60 that sets the operation mode of the system 100 to still image recording mode, video recording mode, playback mode, etc. A zoom selector 62 is operable to change the angle of view (zooming magnification or shooting magnification). The zoom selector 62 may include, for example, a slide-type member, a lever, switch, a wheel, a knob, and/or a switch.

A shutter switch 64 may generate a first shutter switch signal upon a half stroke. Also, the shutter switch 64 may generate a second shutter switch signal upon a full stroke. The system controller 50 may start one or more operations (e.g., AF processing, AE processing, AWB processing, EF processing) in response to the first shutter switch signal. Also, in response to the second shutter switch signal, the system controller 50 may perform and/or initiate one or more operations, including the following: reading image signals from the light sensor 14, converting image signals into image data by the ND converter 16, processing of image data by the image processor 20, writing image data to the memory 30, reading image data from the memory 30, compression of the image data, and writing data to the recording medium 96.

The operation unit 66 may include various buttons, touch panels, and so on. In one embodiment, the operation unit 66 includes one or more of a menu button, a set button, a macro selection button, a multi-image reproduction/repaging button, a single-shot/serial shot/self-timer selection button, a forward (+) menu selection button, a backward (−) menu selection button, etc. The operation unit 66 may also set and change the flash operation mode. The settable modes include, for example, auto, flash-on, and auto red-eye reduction. The operation unit 66 may be used to select a storage format for the captured image information, including JPEG (Joint Photographic Expert Group) and RAW formats. The operation unit 66 may set the system 100 to a plural-image shooting mode, wherein a plurality of images is captured in response to a single shooting instruction (e.g., a signal from the shutter switch 64). This may include auto bracketing, wherein one or more image capturing parameters (e.g., white balance, exposure, aperture settings) are altered in each of the images.

The system 100 also includes a signature selector 68, which may include various buttons, touch panels, joysticks, wheels, levers, etc., and may navigate through one or more menus. The signature selector 68 may be operated to cause the system to generate one or more signatures for a captured image or for a group of captured images. The signature selector 68 may be used to select the segments an image is divided into, the method(s) used to divide the image into segments, the method(s) used to generate the morphological signature(s) (if any is selected), the method(s) used to generate the spectral signature(s) (if any is selected), and/or the methods used to generate the image signature(s). The signature selector 68 may also be used to initiate an image search, such as a search of images stores in the memory 30 or the memory 56, or a search performed by a device that may communicate with the system 100 via the communications unit 84 and the connector/antenna 86.

A power supply controller 80 detects the existence/absence of a power source, the type of the power source, and/or a remaining battery power level, and supplies a necessary voltage and current to other components as required. A power source 82 may include a battery, such as an alkaline battery, a lithium battery, a NiCd battery, a NiMH battery, and an Li battery, an AC adapter, a DC adapter, etc.

The recording media 96 includes a recording unit 94 that is configured with one or more computer-readable and/or computer-writable media. The system 100 and the recording media 96 communicate via an interface 90 of the system 100 and an interface 92 of the recording media 96. Although the illustrated embodiment of the system 100 includes one pair of interfaces 90, 92 and one recording media 96, other embodiments may include additional recording media and/or interfaces.

Additionally, a communications unit 84 is configured to communicate with other devices through channels that may include wired communication (e.g., USB, IEEE 1394, P1284, SCSI, modem, LAN, RS232C) and/or wireless communication (e.g., Bluetooth, WiFi). A connector/antenna 86 can connect the system 100 to other systems and devices via a wired connection and/or communicate wirelessly with other system and devices.

Figure 2:
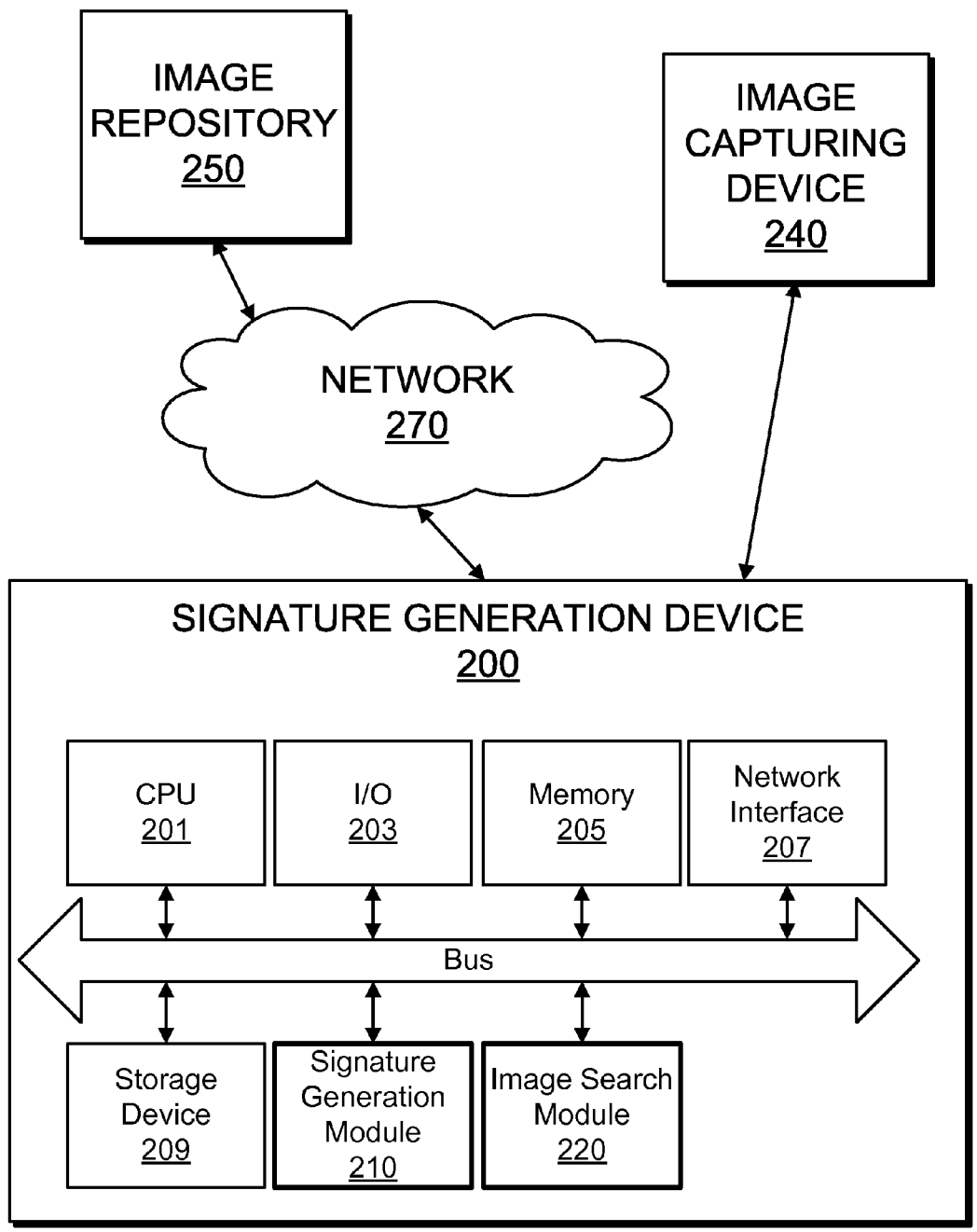
FIG. 2 illustrates an embodiment of a system for evaluating images.

FIG. 2 illustrates an embodiment of a signature generation device 200. The signature generation device 200 communicates with an image repository 250 and an image capturing device 240. In the embodiment shown, the signature generation device 200 communicates with the image repository 250 via a network 270. The network 270 may include one network or any combination of networks, including the Internet, WANs, PANs, HANs, MANs, and LANs, as well as any combination of wired and wireless networks. The signature generation device 200 communicates with the image capturing device 240 via a direct connection (wired and/or wireless), though in other embodiments the signature generation device 200, the image repository 250, and the image capturing device 240 may communicate via different configurations than is illustrated in FIG. 2 (e.g., all communicate via direct connections, all communicate via one or more networks). The image repository 250 is configured to store and search images, for example images in a database of images. The image capturing device 240 is configured to capture images of a scene (e.g., an RGB camera (standalone, cell phone, etc.), a computational camera).

The signature generation device 200 includes one or more processors 201 (also referred to herein as "CPU 201"), which may be conventional or customized central processing units (e.g., microprocessor(s)). The CPU 201 is configured to read and execute computer readable instructions, and the CPU 201 may command/and or control other components of the signature generation device 200. The signature generation device 200 also includes I/O interfaces 203, which provide communication interfaces to input and output devices, which may include a keyboard, a display (e.g., the image repository 250), a mouse, a printing device, a touch screen, a light pen, an optical storage device, a scanner, a microphone, a camera, a drive, etc.

The signature generation device 200 additionally includes a memory 205, which includes one or more computer-readable and/or writable media. The network interface 207 allows the signature generation device 200 to communicate with the network 270 and other systems and devices via the network 270, and the network interface 207 may have wired and/or wireless capabilities. The storage device 209 is configured to store data (e.g., images) and/or computer-executable instructions, and may include, for example, a magnetic storage device (e.g., a hard drive), an optical storage device, and/or a solid state drive. The components of the signature generation device 200 are connected via a bus. Also, the signature generation device 200 includes an operating system, which manages one or more of the hardware, the processes, the application, the interrupts, the memory, and the file system.

The signature generation device 200 also includes a signature generation module 210 and an image search module 220. The signature generation module 210 generates signatures for images. The image search module 220 generates search queries, responds to search queries, receives search results, and/or performs searches for images. The searches may be based on the signatures generated by the signature generation module 210. The image search module 220 may generate a search request that includes one or more image signatures and send the search request to the image repository 250. The search request may also indicate a search methodology. The image search module 220 receives the search results from the image repository 250. Depending on the results, the image search module may initiate another search. For example, if the results are not satisfactory (e.g., no results, the results lack satisfactory quality, the results to not satisfy certain criteria), the image search module 220 may generate another search request and/or may request a different signature from the signature generation module 210.

The image repository 250 may search images by comparing the received image signature(s) with the images and/or the respective image signatures of the images it stores and/or may access. The image repository 250 may perform a multilayer search. For example, the image repository 250 may first search for images by comparing one or more spectral signatures of the image with the respective spectral signatures of the images in the image repository 250. Additionally, the image repository 250 may identify materials in the image based on the spectral signatures and compare the materials with the materials of the images its image database(s). The spectral signature search may be less computationally expensive than a morphological search, and performing the spectral search first may speed up the search by filtering as may images as possible with the less computationally expensive search.

Second, the image repository may perform a morphological search on the results of the spectral signature comparison. If the morphological search and/or the spectral search do not return enough satisfactory images using the received image signature(s) from the search request, the image repository 250 may perform a search with different sensitivities. Thus, subsequent searches may accept a greater difference between a received signature (spectral or morphological) and images (e.g., the signatures of the images) stored in the image repository 250. The searches may be performed until a desired quantity and/or quality of one or more similar/identical images is located and/or returned.

Figure 3:
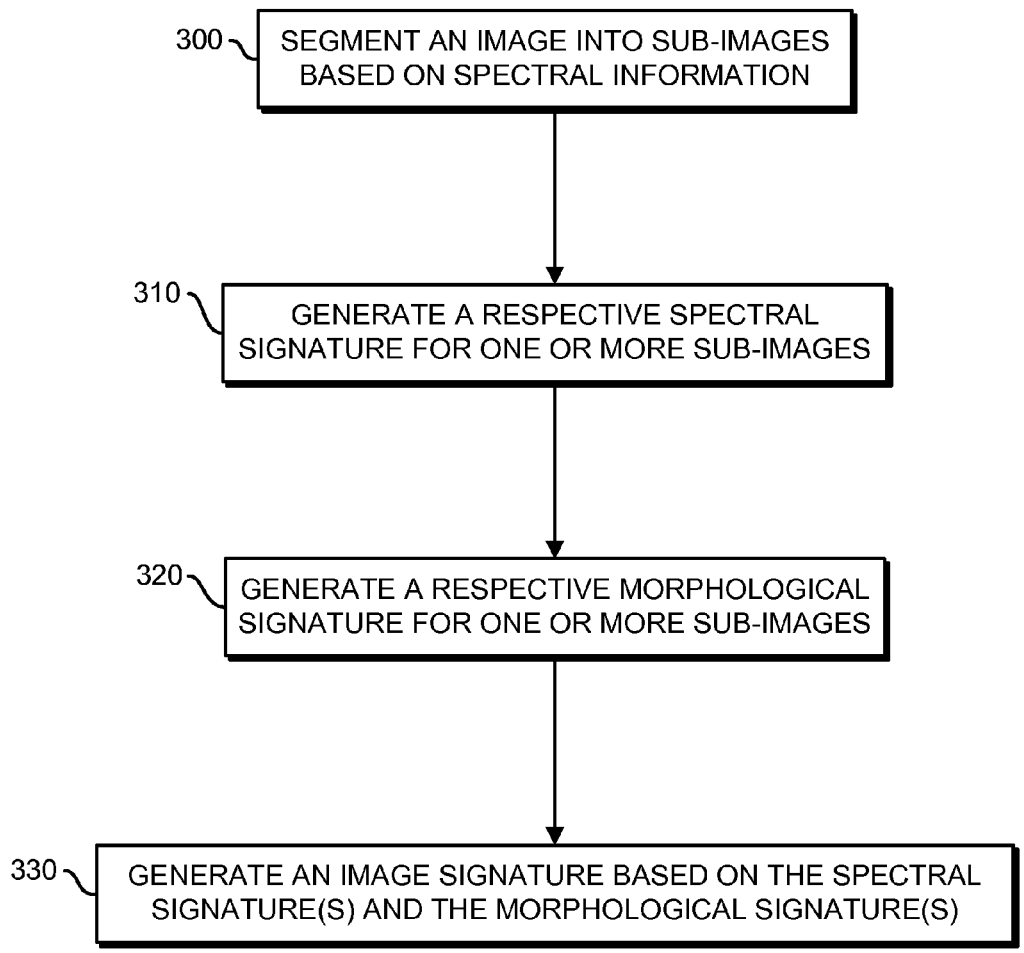
FIG. 3 is a block diagram that illustrates an embodiment of a method for generating an image signature.

FIG. 3 is a block diagram that illustrates an embodiment of a method for generating an image signature. Other embodiments of this method and the other methods described herein may omit blocks, add blocks, change the order of the blocks, combine blocks, and/or divide blocks into separate blocks. Additionally, one or more components of the systems and devices described herein may implement the method shown in FIG. 3 and the other methods described herein.

In block 300, an image is segmented into sub-images based on the spectral information in the image. The segmenting may include identifying portions of the image that have certain spectral properties and segmenting the image into the sub-images based on the spectral properties. For example, a portion of the image that corresponds to a material may be identified by determining the reflectance of the materials based on the spectral information in the image, and the materials in the image may correspond to objects in the image. Thus, if the identified material is wood it may indicate a wooden object, if the material is metal it may indicate a metal object, if the material is plastic it may indicate a plastic object, if the material is fur it may indicate an animal, etc.

Multi-spectral images may provide more information about the underlying materials than an RGB image can provide. For example, since the color of a pixel in an RGB image is a sum of all the light detected by the respective pixel in a light sensor, the color of the pixel may not indicate much about the underlying materials, since different materials may have the same sum when the light sensor detects and sums the light reflected by the material, and thus the different materials may appear to have nearly identical colors. For example, a photograph of an apple may appear to have the same or nearly the same color as an apple. However, a multi-spectral image may indicate the underlying spectral components, which may be used to distinguish between the photograph of the apple and the actual apple, by indicating the actual underlying materials of the photograph and/or the apple.

The image may be segmented into sub-images based on the materials indicated by the image, and the materials may correspond to object in the image (apple, person, rock, car, etc.). Thus, the sub-images may correspond to one or more respective objects in the image. The image may also be segmented into sub-images using other information and/or techniques, including shape detection, RGB color, depth information, predetermined segments (e.g., a grid), etc.

Additionally, the one or more sub-images may be determined based in part on regions of interest in the image, user selections, and/or other selection algorithms (e.g., ones that select sub-images most likely not to correspond to the background of the image, that select certain materials, that reflect more or less than a threshold level of total light, that correspond to certain wavelengths of light).

In block 310, a respective spectral signature is generated for one or more sub-images. The spectral signature(s) may be generated by techniques discussed above, as well as other techniques such as, finding non-orthogonal basis vectors, independent component analysis that produces independent component vectors, or some compressive sensing technique that may be used as spectral signatures. The spectral reflectance itself could be used as a spectral signature, but spectral reflectance curves are sometimes redundant and there may not be a need to preserve all of the spectral reflectance information. Thus some compressed representation of spectral reflectance, such as eigenvectors or independent component vectors, may be used. The spectral signature may include, inter alia, information about the reflectance of objects in the sub-image, about light invisible to the human eye, and/or about one or more discrete spectrums of light in the sub-image.

Next, in block 320, a morphological signature is generated for one or more sub-images. The morphological signature(s) may be generated by various algorithms and techniques, including, as mentioned above, SIFT, CHoG, edge orientation histograms, shape contexts, edge detection, SURF, grammars, shading, etc.

In block 330, an image signature is generated based on the spectral signature(s) and the morphological signature(s). For example, in one embodiment, the spectral signature and morphological signature for one or more sub-images are concatenated to form the image signature. Another embodiment generates a morphological signature to find a set of candidate objects and, once a limited set of objects is determined based on morphology, spectral signatures could be generated for the limited set of objects, in order to provide an accurate and robust selection. This would differentiate an actual apple from a picture of an apple since they have same/similar morphologies but different spectral profiles. Conversely, one can start from spectral signatures and, after a selection of a limited set of candidate objects, morphological information could be used to select the object(s). This process would differentiate between an unpainted pencil made of cedar wood and an actual cedar tree trunk. Though they would have very similar spectral reflectances, the morphological analysis would differentiate these objects.

Figure 4:
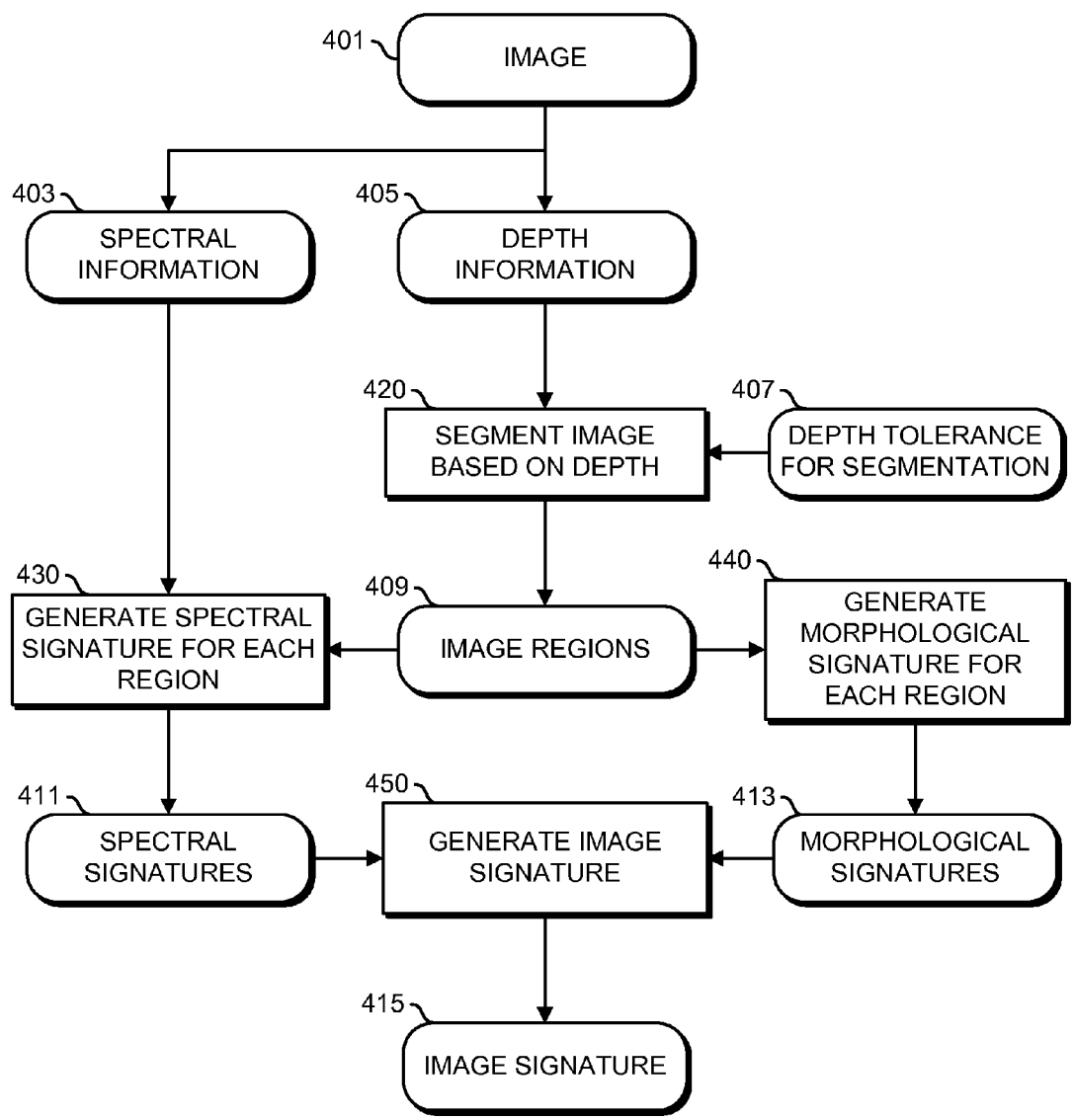
FIG. 4 is a block diagram that illustrates an embodiment of a method for generating an image signature.

FIG. 4 is a block diagram that illustrates an embodiment of a method for generating an image signature. Spectral information 403 and depth information 405 are extracted from an image 401. In block 420, the depth information 405 and depth tolerance for segmentation 407 are used to segment the image 401 based at least in part on the depth information 405. The image may also be segmented based on other criteria, for example spectral information, morphological information, etc. The segmentation of the image in block 420 generates image regions 409. In block 430, respective spectral signatures 411 are generated for each region based on the spectral information 403 and the image regions 409. In block 440, respective morphological signatures 413 are generated for each region based on the image regions 409. Finally, in block 450 the spectral signatures 411 and the morphological signatures 413 are used to generate an image signature 415.

Figure 5:
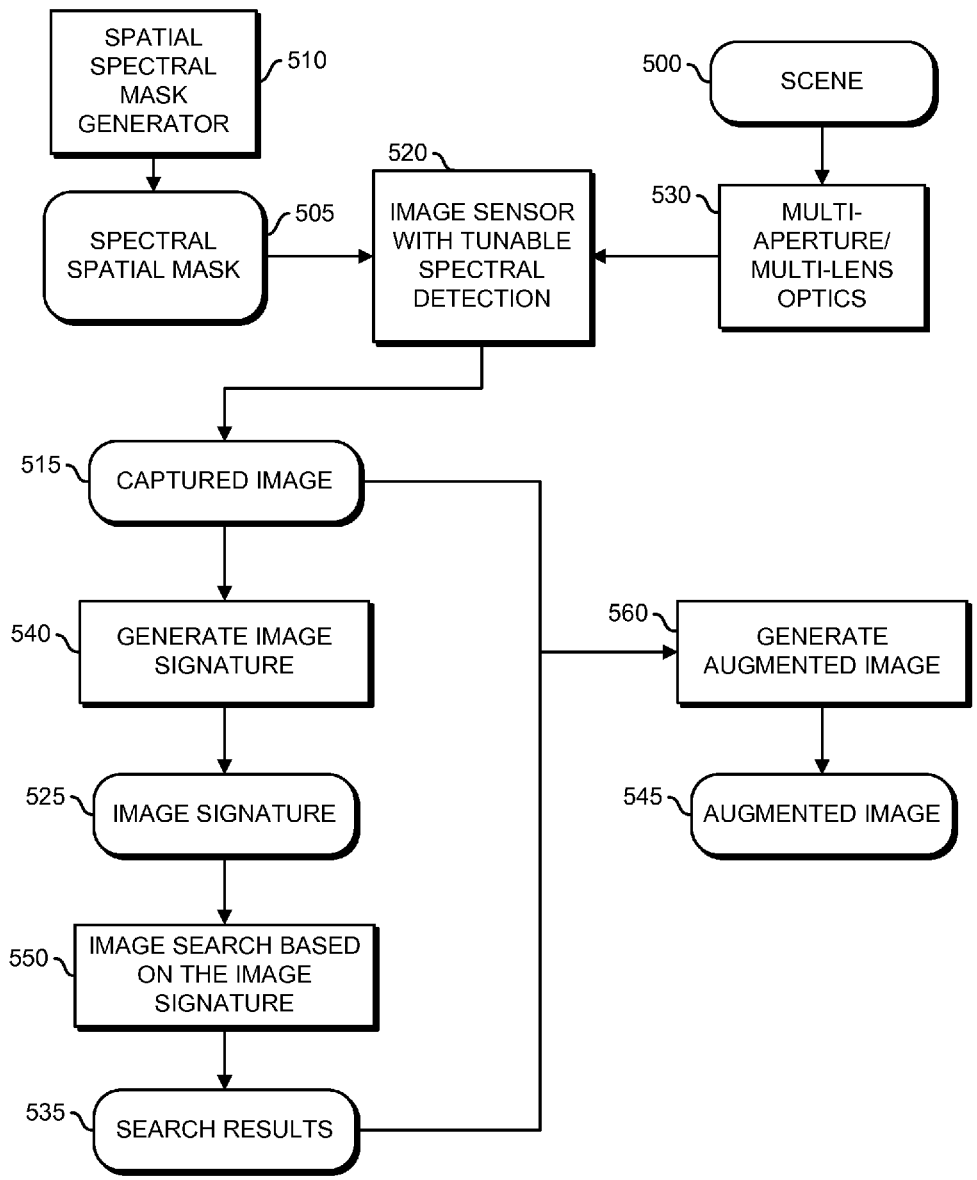
FIG. 5 is a block diagram that illustrates an embodiment of a method for generating an augmented image.

FIG. 5 is a block diagram that illustrates an embodiment of a method for generating an augmented image. A spatial mask generator 510 generates a spectral spatial mask 505 for an image sensor with tunable spectral sensitivities 520. The spectral spatial mask indicates the spectral sensitivities that the image sensor 520 is to be configured to detect. Also, multi-aperture/multi-lens optics 530 are used to direct light from a scene 500 to the image sensor 520. The image sensor 520 detects the light (which may include light field information) according to the spectral spatial mask 505 and generates a captured image 515.

Next, in block 540, an image signature 525 is generated, for example by the methods described herein. In block 550, an image search is performed based on the image signature 525 to generate search results 535. The search results may include other images and/or information about the captured image 515 (e.g., location, history, people, date, time, identification of objects in the image, the type of device used to capture the image, price). In block 560 an augmented image 545 is generated from the captured image 515 and the search results 535. The augmented image 545 may present some of the information about the captured image 515 (e.g., indicate people, objects, location, price) and/or include information from the other images (e.g., fill in part of the scene that is missing because of an obstruction with information from the other images).

Figure 6:
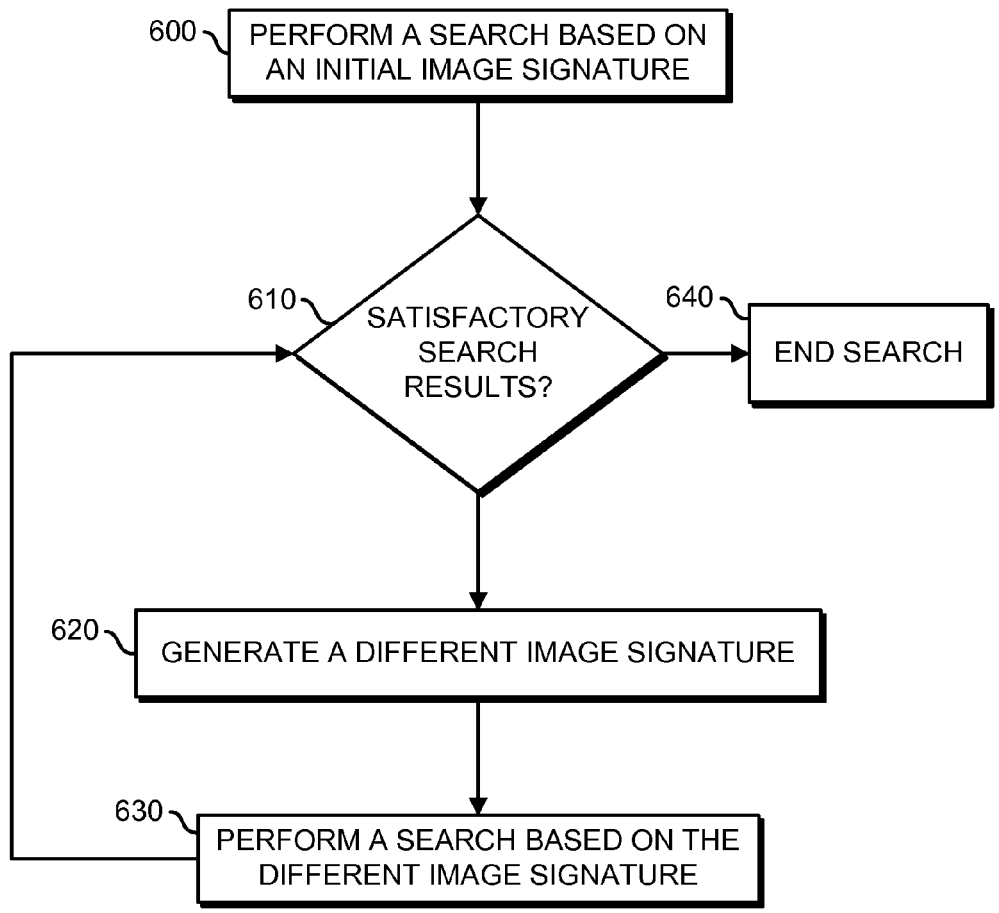
FIG. 6 is a block diagram that illustrates an embodiment of a method for searching images based on an image signature.

FIG. 6 is a block diagram that illustrates an embodiment of a method for searching images based on an image signature. In block 600, a search is performed based on an initial image signature, such as a signature generated by one of the methods described herein. Next, in block 610, it is determined if the search results (e.g., images returned by the search) are satisfactory. The criteria used to determine if the search results are satisfactory may include the number of images, the quality of the images, the similarity of the images to the image signature, the date the images were captured, the size of the images, etc. If the results are satisfactory, flow proceeds to block 640, and the search is ended. If the results are not satisfactory, flow proceeds to block 620, and a different image signature is generated. The different image signature may be generated by using one or more different methods than were used to generate the initial image signature, one or more additional methods than were used to generate the initial image signature, and/or by using one or more different parameters than were used to generate the initial image signature. For example, the initial image signature may be generated in part using SIFT, and the different image signature may also be generated in part using SIFT but with different parameters. Or the different image signature may be generated in part using SURF. Also, generating the initial image signature may have included segmenting the image without using depth information, and generating the different image signature may include segmenting the image using depth information. Thus, the different image may have different segmentation, different spectral signatures, different morphological signatures, and/or different image signatures. This iterative process could also generate a different image signature by incrementally using an additional type of image signature; for example, starting with morphological information and if a satisfactory result is not achieved, it could add another image signature based on spectral signature, etc. Once the different image signature is generated, flow proceeds to block 630, where a search is performed based on the different image signature. Flow then proceeds to block 610. Thus, searches may be performed with varying image signatures until the searches generate satisfactory results.

Figure 7:
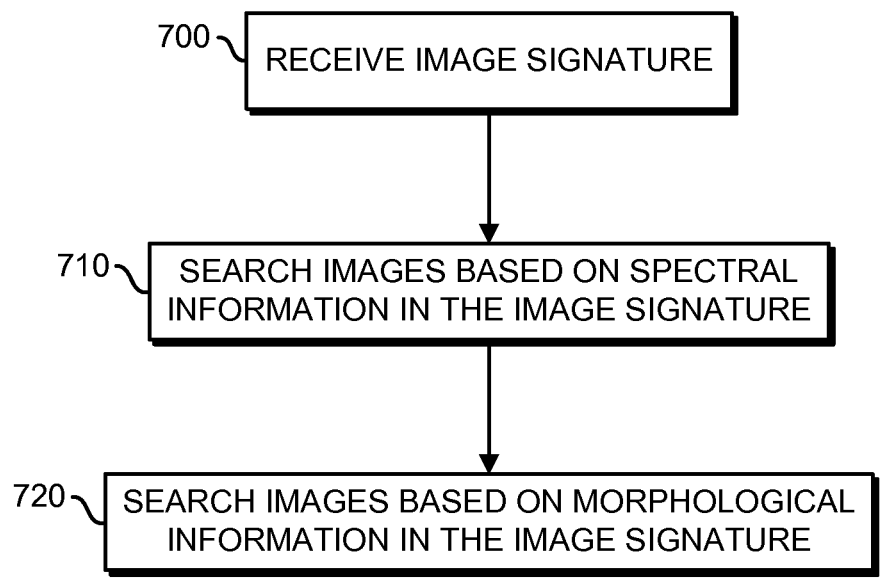
FIG. 7 is a block diagram that illustrates an embodiment of a method for searching images based on an image signature.

FIG. 7 is a block diagram that illustrates an embodiment of a method for searching images based on an image signature. In block 700, an image signature is received. In block 710, images are search based on spectral information in the image signature (e.g., spectral signatures of respective sub-images). A search based on spectral information may be faster and/or less computationally expensive than a search based on morphological information, so performing the search based on the spectral information may reduce the overall search time/expense by narrowing the search results as much as possible before performing a morphological search. In block 720, images (e.g., the images returned by the search in block 710) are searched based on morphological information in the image signature. In other embodiments, the search based on the morphological information may be performed before or concurrently with the search based on the spectral information.

Figure 8:
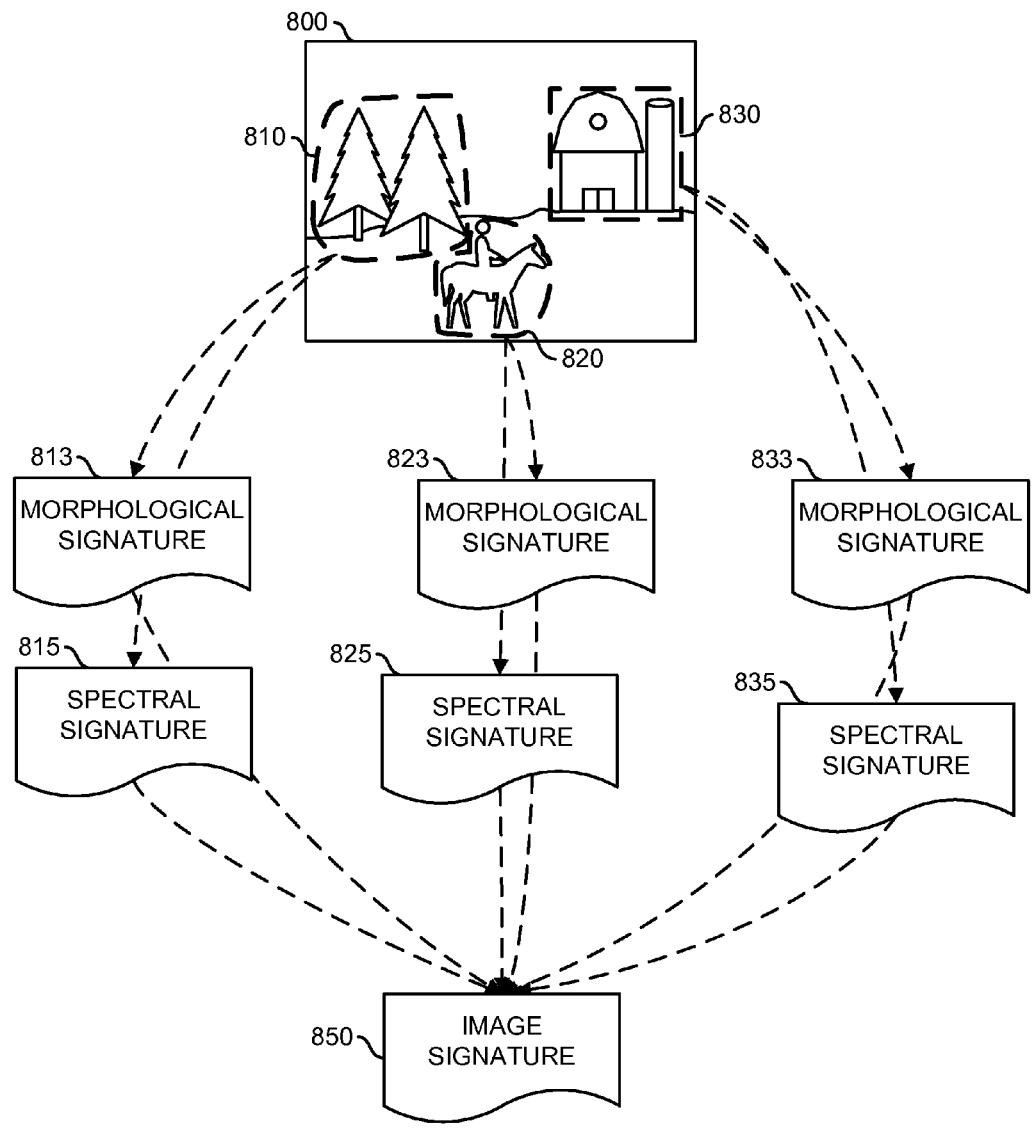
FIG. 8 is a block diagram that illustrates an embodiment of the generation of an image signature.

FIG. 8 is a block diagram that illustrates an embodiment of the generation of an image signature. An image 800 is divided into sub-images 810, 820, and 830. Though not every part of the image 800 is included in a sub-image in the embodiment shown, in other embodiments every part of the image 800 may be included in a sub-image. Additionally, an image may be divided into a different number of sub-images, and sub-images may overlap. A morphological signature 813 and a spectral signature 815 are generated for sub-image 810, a morphological signature 823 and a spectral signature 825 are generated for sub-image 820, and a morphological signature 833 and a spectral signature 835 are generated for sub-image 830. An image signature 850 is generated based on the morphological signature 813, the spectral signature 815, the morphological signature 823, the spectral signature 825, and the morphological signature 833, and the spectral signature 835.

The above described devices, systems, and methods can be achieved by supplying one or more storage media having stored thereon computer-executable instructions for realizing the above described operations to one or more devices that are configured to read the computer-executable instructions stored in the one or more storage media and execute them. In this case, the systems and/or devices perform the operations of the above-described embodiments when executing the computer-executable instructions read from the one or more storage media. Also, an operating system on the one or more systems and/or devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk and a hard disk), an optical disc (including a CD, a DVD, a Blu-ray disc), a magneto-optical disk, a magnetic tape, and a solid state drive (including flash memory, DRAM, SRAM) can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

While the above disclosure describes illustrative embodiments, the invention is not limited to the above disclosure. To the contrary, the invention covers various modifications and equivalent arrangements within the spirit and scope of the appended claims.

What is claimed is:

1. A method for evaluating an image, the method comprising:
    obtaining a computational image, wherein, for each pixel in the computational image, the computational image includes spectral information that describes the spectral values of the pixel when captured using different spectral sensitivities, wherein the spectral image was generated from two or more image captures by one or more tunable imaging sensors, and wherein the one or more tunable imaging sensors were tuned to different spectral sensitivities during the two or more image captures;
    segmenting the computational image into sub-images based on the spectral information that describes the spectral values of each pixel when captured using different spectral sensitivities;
    generating respective morphological signatures for the sub-images;
    generating respective spectral signatures for the sub-images; and
    generating an image signature based on the morphological signatures and the spectral signatures.

2. The method of claim 1, wherein segmenting the computational image into sub-images includes
    identifying one or more spectral properties in the computational image corresponding to one or more spectral properties of one or more materials based on the spectral information in the computational image, and
    segmenting the computational image into sub-images based on the spectral properties.

3. The method of claim 2, wherein the one or more spectral properties include spectral reflectance.

4. The method of claim 1, further comprising:
    searching for one or more images similar to the computational image based on the image signature; and
    if one or more similar images are not located by the search, segmenting the computational image into different sub-images,
    generating respective morphological signatures for the different sub-images,
    generating respective spectral signatures for the different sub-images, and
    generating a different image signature based on the morphological signatures and the spectral signatures of the different sub-images.

5. The method of claim 4, further comprising searching for one or more images similar to the computational image based on the different resulting image signature.

6. The method of claim 1, wherein segmenting the computational image into sub-images is based at least in part on depth information in the computational image, wherein, for each pixel in the computational image, the computational image includes depth information that indicates a distance from a sensor that captured the computational image.

7. The method of claim 6, wherein generating the respective morphological signatures for the sub-images includes generating a respective three-dimensional histogram of gradients for the sub-images based at least in part on the depth information in the computational image.

8. The method of claim 1, wherein segmenting the computational image into sub-images based on the spectral information includes estimating a material in the computational image based on the spectral information.

9. The method of claim 1, wherein generating the respective spectral signatures for the sub-images includes calculating respective coefficients of eigenvectors for the sub-images.

10. A system for evaluating an image, the system comprising
   a computer readable medium;
   a network interface configured to send data to and receive data from one or more other devices or systems; and
   one or more processors configured to cause one or more computing devices to
      obtain a computational image, wherein, for each pixel in the computational image, the computational image includes spectral information that describes the spectral values of the pixel when captured using different spectral sensitivities, wherein the spectral image was generated from two or more image captures by one or more tunable imaging sensors, and wherein the one or more tunable imaging sensors were tuned to different spectral sensitivities during the two or more image captures;
      generate sub-images from the computational image based on the spectral information that describes the spectral values of each pixel when captured using different spectral sensitivities,
      generate respective morphological signatures for the sub-images,
      generate respective spectral signatures for the sub-images, and
      generate a combined image signature based on the morphological signatures and the spectral signatures.

11. The system of claim 10, wherein the computational image includes spectral information that indicates light not visible to a human eye, and wherein the respective spectral signatures for the sub-images are generated based at least in part on the light not visible to the human eye.

12. The system of claim 10, wherein the computational image includes depth information, and wherein the respective morphological signatures are generated based at least in part on the depth information.

13. The system of claim 12, wherein the depth information is detected by multi-aperture optics in an image capturing device that captured the computational image.

14. The system of claim 10, wherein generating the sub-images includes identifying one or more objects in the computational image; and generating respective sub-images corresponding to the one or more objects.

15. One or more non-transitory computer-readable media storing instructions that, when executed by one or more computing devices, cause the one or more computing devices to perform operations comprising:
   obtaining a computational image, wherein, for each pixel in the computational image, the computational image includes spectral information that describes the spectral values of the pixel when captured using different spectral sensitivities, wherein the spectral image was generated from two or more image captures by one or more tunable imaging sensors, and wherein the one or more tunable imaging sensors were tuned to different spectral sensitivities during the two or more image captures;
   partitioning the computational image into sub-images based at least on the spectral information that describes the spectral values of each pixel when captured using different spectral sensitivities;
   generating respective spectral signatures for the sub-images; and
   generating respective morphological signatures for the sub-images.

16. The non-transitory computer-readable media of claim 15, wherein the operations further comprise:
   searching a plurality of images for spectrally similar images to the computational images based on the spectral signatures; and
   searching the spectrally similar images for images with morphology similar to the computational image based on the morphological signatures.

17. The non-transitory computer-readable media of claim 16, wherein the operations further comprise:
   if no images with morphology similar to the computational image are located by searching, generating different respective spectral signatures for the sub-images and generating different respective morphological signatures for the sub-images.

18. The non-transitory computer-readable media of claim 15, wherein the computational image includes depth information for each pixel in the computational image, and wherein partitioning the computational into sub-images is further based at least in part on the depth information of the pixels.

19. The non-transitory computer-readable media of claim 15, wherein partitioning the computational image into sub-images based at least on spectral information includes estimating a material in the computational image based on the spectral information, identifying an object based on the material, and partitioning the computational image into a sub-image of the object.

* * * * *